Sept. 19, 1939.   W. J. MILLS   2,173,399
REPAIR SLEEVE FOR PIPE LINES

Filed Dec. 13, 1937

INVENTOR
Wm J. Mills
BY
ATTORNEY

Patented Sept. 19, 1939

2,173,399

UNITED STATES PATENT OFFICE 2,173,399

REPAIR SLEEVE FOR PIPE LINES

William J. Mills, Fresno, Calif.

Application December 13, 1937, Serial No. 179,496

8 Claims. (Cl. 138—99)

This invention relates generally to a device for repairing ruptured or leaky pipe lines, and in particular relates to, and it is my principal object to provide, a repair sleeve designed for use to effect a permanent repair of high pressure pipe lines of the coupled type at the coupling.

With coupled pipe lines wherein the pipe sections are secured together by means of couplings threaded thereon, there is a tendency for ruptures or leaks to occur at the couplings due to the inherent weakness of the threaded connections, especially in long distance oil transmission pipe lines which are subject to substantial stresses and strains.

As the pipe sections cannot be separated to permit the placement of a one-piece tubular repair sleeve over the damaged area, it is requisite that a repair device be capable of placement without separation of the pipe sections. It is therefore an additional object of this invention to provide a sectional repair sleeve which may be positioned without separation of the pipe sections and without the use of bolts or the like.

Additional objects of my invention are to provide an effective two-piece lock collar for use in combination with the repair sleeve; and to so form the sectional repair sleeve that when the same is positioned within the collar for welding, the welding fire cannot directly contact and burn the packing surrounding the pipe and within the sleeve.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
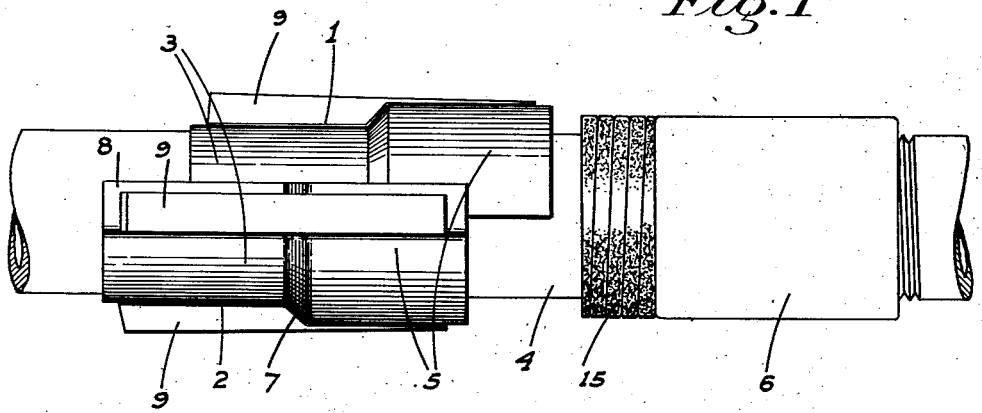
Figure 1 is a side elevation of the sectional repair sleeve surrounding a pipe preparatory to engagement with the pipe coupling, the sleeve being shown with one section slipped only into partial engagement with the other section.
Figure 2:
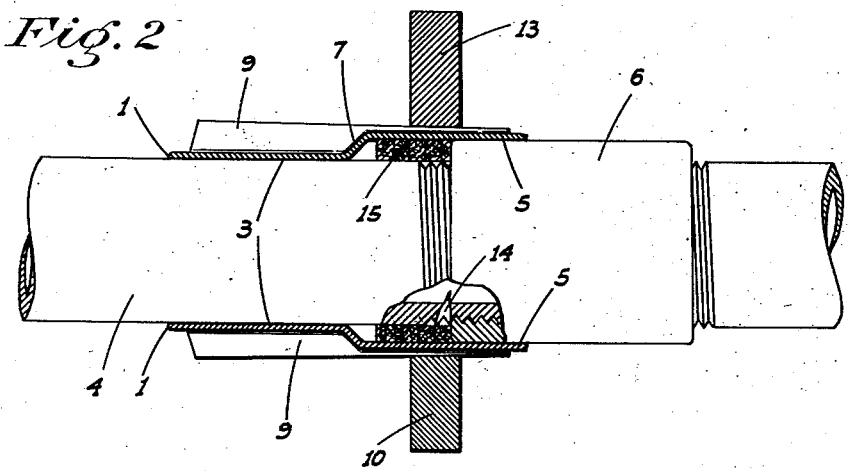
Figure 2 is a sectional elevation illustrating the sleeve sections fully engaged and the sleeve partially engaged over the pipe coupling; the lock collar surrounding the sleeve.
Figure 3:
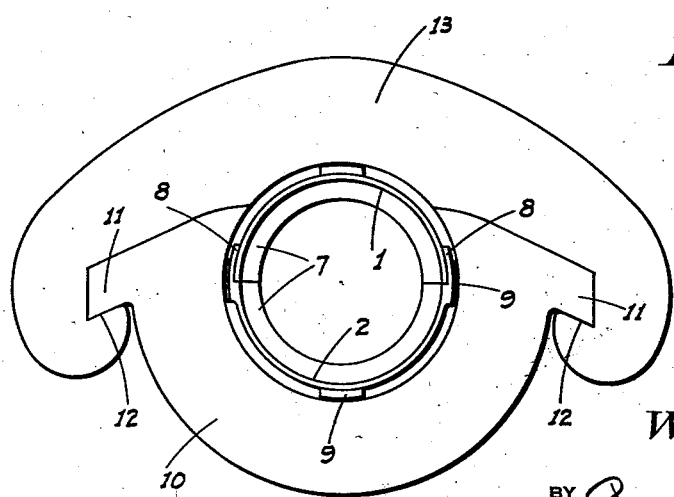
Figure 3 is an end view of the assembled sleeve and surrounding lock collar; the device being shown detached from the pipe.

Referring now more particularly to the characters of reference on the drawing, my invention comprises a cylindrical sleeve, of pressed or deformable metal, which is formed of a pair of complementary semi-circular sections indicated at 1 and 2; the sleeve for a portion of its length as at 3 being of a diameter to closely surround a pipe 4, while the other portion 5 of the sleeve is enlarged in diameter to closely surround a pipe coupling 6. An annular shoulder 7 is thus formed between sleeve portions 3 and 5.

The sleeve section 2 is provided along its side edges with lips or flanges 8 arranged to engage the outer surface of the other section 1 adjacent its side edges; these flanges having the same curvature as the surface against which they engage. Thus, the sections 1 and 2 can be slipped together with relative longitudinal movement but cannot separate in a radial direction.

The sectional repair sleeve, as above, is provided with a plurality of wedges 9 fixed longitudinally on the sleeve and spaced equi-distant circumferentially thereof. The outer faces of these wedges have a slight taper (approximately 2°) relative to the axis of the sleeve and toward the coupling engaging end of the sleeve. It is preferable that the wedges terminate at both ends short of the ends of the sleeve.

I further provide a two-piece lock collar (for the purpose hereinafter specified in detail) which comprises a C-shaped member 10 adapted to closely and symmetrically engage about the coupling engaging portion of the repair sleeve and to an extent in excess of 180° but not to such extent as to prevent entry of said member over pipe 4 preparatory to placement of the member on the sleeve. Said member is provided on each side with an outwardly projecting ear 11 which removably engages in a complementary notch 12 in a yoke like member 13 which is formed to symmetrically and closely engage the remaining portion of the sleeve. The lock collar segments can only be assembled by relative movement in an axial direction, and when so assembled and in place about the sleeve, forms with its inner edge a circular and non-yielding engaging surface against which the wedges cooperate. The inner edge of the lock collar is beveled to correspond with the taper of the wedges and to thus cooperate with the same in flat face to face relation.

*Use*

My improved repair sleeve for pipe lines is used to repair a rupture or leak at a coupling in the following manner.

When a rupture or leak occurs, as at 14 for example, a length of packing 15 is wound about pipe 4 adjacent the end of the coupling 6 and over the rupture. Section 1 of the sleeve is placed over pipe 4 and section 2 likewise positioned beyond section 1; the two sections being then slipped together into complementary relation. The flanges 8 prevent radial separation of the engaged sections. The large diameter end of the sleeve is of course disposed adjacent the coupling 6.

The sleeve, after assembly as above, is shifted along the pipe and the large diameter portion 5 engaged over the coupling 6 as far as possible by hand, the packing being then of course enclosed by the sleeve.

The lock collar is then assembled about the large diameter portion of the sleeve and about the coupling. Thereafter the sleeve is driven, by striking the butt end of wedges 9, in a coupling engaging direction as far as possible and until packing 15 is compressed between shoulder 7 and the adjacent coupling end. The action of wedges 9 is to force and deform the sleeve into very close surrounding and frictional contact with the engaged portions of the pipe and coupling.

As thus held the sleeve is welded along the longitudinal lines of engagement of flanges 8 and the adjacent surfaces of the section 1, as well as welded entirely about each end to the coupling and pipe respectively. The lock collar is removed for reuse after the welding operation is completed.

By employing the packing 15, the flow of fluid from the pipe is temporarily stopped when the sleeve is driven into place, and the subsequent welding of the sleeve as above effects a permanent repair of the rupture or leak, and which welding can be done with safety as the fluid flow, as oil, gasoline, etc., has been stopped. It is to be noted that no bolts or the like are employed to effect the close frictional engagement of the sleeve on the coupling and pipe before welding the sleeve in place. Also, by reason of the particular structure of the sleeve no fire can contact the packing 15 during the welding operation.

When a ruptured or leaking coupling connection has been repaired as above, the repaired portion of the pipe line is as strong or stronger than when originally laid.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A repair sleeve for pipe lines comprising a pair of initially separate complementary semicircular sections, means on one section arranged to frictionally engage the other section when the sections are in complementary position and to hold the same against radial separation but without limiting relative longitudinal sliding movement of the sections to or from such complementary position, and wedge means formed in part with the sleeve, and including a collar surrounding the sleeve, arranged to force the sleeve into gripping contact with the surrounded portion of the pipe line upon relative longitudinal movement of the sleeve and collar in a predetermined direction.

2. A repair sleeve for coupled pipe lines comprising a pair of complementary semi-circular sections, flanges formed along the side edges of one section and frictionally and symmetrically engaging the outer surface of the other section adjacent its side edges, one portion of the sleeve being of a diameter to engage over a pipe coupling of predetermined diameter and the remainder of the sleeve of a diameter to engage about the pipe adjacent the coupling, a plurality of longitudinally extending circumferentially spaced wedges fixed on the exterior of the sleeve, the entering end of the wedges being disposed at the coupling engaging end of the sleeve, and a segmental lock collar adapted to removably surround the coupling portion of the sleeve.

3. A repair sleeve unit for coupled pipe sections and adapted for use at a coupling, said repair sleeve unit comprising a sleeve formed of a pair of complementary substantially semi-circular sections of deformable material, one portion of the sleeve being of substantially the same diameter as and adapted to surround a coupling and the remaining portion of the sleeve being of substantially the same diameter as and adapted to surround the pipe section adjacent said coupling, there being a shoulder formed between said sleeve portions, and means formed in part with the sleeve and arranged to deform said sleeve into close frictional contact with the surrounded portions of the coupling and pipe section upon movement of the sleeve in a direction to advance said shoulder toward the surrounded end of the coupling.

4. In combination, a pipe section having a coupling threaded on one end thereof, a repair sleeve surrounding the coupling and pipe section adjacent said coupling, said sleeve being formed of a pair of complementary substantially semi-circular sections of deformable material, one portion of the sleeve being of substantially the same diameter as and adapted to surround the coupling, and the remaining portion of the sleeve being of substantially the same diameter as and adapted to surround the pipe section adjacent said coupling, there being a shoulder formed by the said sleeve portions, a packing about the pipe section between the shoulder and adjacent end of the coupling, and means formed in part with the sleeve and arranged to deform said sleeve into close frictional contact with the surrounded portions of the coupling and pipe section upon movement of the sleeve in a direction to compress the packing between said shoulder and said adjacent end of the coupling.

5. A device as in claim 1 in which said first named means comprises a flange formed along each side edge of one section and arranged to frictionally engage the outer surface of the other section adjacent the corresponding edge; the flanges being symmetrical to the curvature of said other section.

6. A repair sleeve for pipe lines comprising a pair of initially separate complementary semicircular sections, and wedge means formed in part with the sleeve, and including a lock collar surrounding the sleeve, arranged to force the sleeve in to gripping contact with the surrounded portion of the pipe line upon relative longitudinal movement of the sleeve and collar in a predetermined direction; said lock collar comprising a pair of segments, one of which is formed adjacent each end with outwardly projecting ears, the other section having notches into which said ears engage upon relative axial movement of the segments, said ear and notch arrangement preventing relative radial separation of the segments.

7. A repair sleeve unit for pipe lines, said unit comprising a sleeve including a pair of initially separate complementary sections of substantially semi-circular cross-section and of deformable material, a plurality of longitudinally extending circumferentially spaced wedges fixed on the exterior of the sleeve, and a collar adapted to surround the sleeve and frictionally engage the faces of said wedges, said wedges and collar cooperating to deform the sleeve radially inward upon relative longitudinal movement of said sleeve and collar in a predetermined direction.

8. A device as in claim 7, in which the wedge engaging edge of the collar is beveled to correspond to the taper of the wedges whereby said edge will engage the wedges in flat face to face engagement.

WILLIAM J. MILLS.